United States Patent [19]

Ebeling et al.

[11] 4,165,211

[45] Aug. 21, 1979

[54] APPARATUS FOR APPLYING A LAYER OF A LIQUID FOAMABLE REACTION MIXTURE TO A CONTINUOUSLY MOVING SUPPORT

[75] Inventors: Wilfried Ebeling, Cologne; Volker Onnenberg, Wiel; Alberto C. Gonzalez-Dörner, Leverkusen; Bernd Lehmann, Cologne; Hansjürgen Rabe; Klaus Schulte, both of Leverkusen, all of Fed. Rep. of Germany

[73] Assignee: Bayer Aktiengesellschaft, Leverkusen, Fed. Rep. of Germany

[21] Appl. No.: 812,011

[22] Filed: Jul. 1, 1977

[30] Foreign Application Priority Data

Jul. 10, 1976 [DE] Fed. Rep. of Germany ....... 2631145

[51] Int. Cl.² ............................................. B29D 27/04
[52] U.S. Cl. .................................... 425/224; 222/460; 264/DIG. 13; 264/DIG. 84; 425/817 C
[58] Field of Search ...................... 222/460, 461, 462; 264/51, 46.2, DIG. 84, 45.4, DIG. 13; 425/4 C, 817 C, 224, 329, 375, 89; 193/3, 11, 33, 34; 214/17 C

[56] References Cited

U.S. PATENT DOCUMENTS

| 2,763,894 | 9/1956 | Bulkley et al. ................. 425/224 X |
| 3,786,122 | 1/1974 | Berg ................................. 425/4 C X |
| 3,868,028 | 2/1975 | Mausser ......................... 214/17 C |

Primary Examiner—Mark Rosenbaum
Attorney, Agent, or Firm—Gene Harsh; Joseph C. Gil; R. Brent Olson

[57] ABSTRACT

The instant invention relates to a process and an apparatus for applying a layer of liquid, foamable reaction mixture to a continuously moving support, such as for the production of foam blocks or foam sandwich panels having a thick foam core.

9 Claims, 6 Drawing Figures

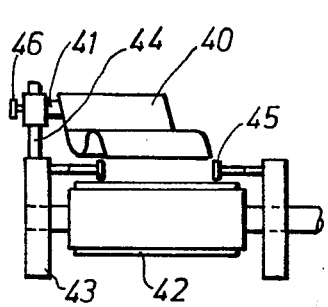
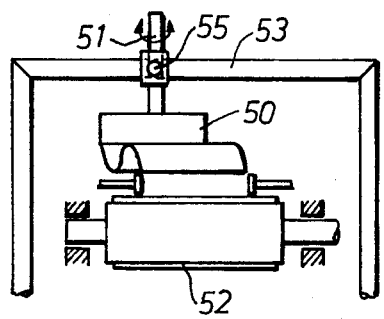
FIG. 3   FIG. 5
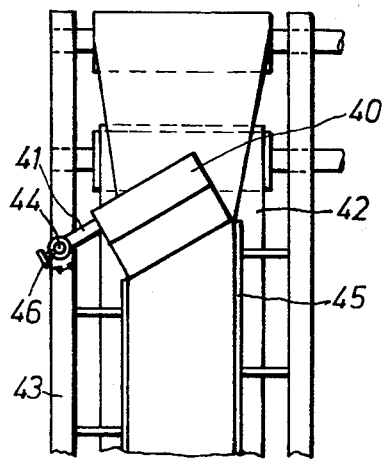
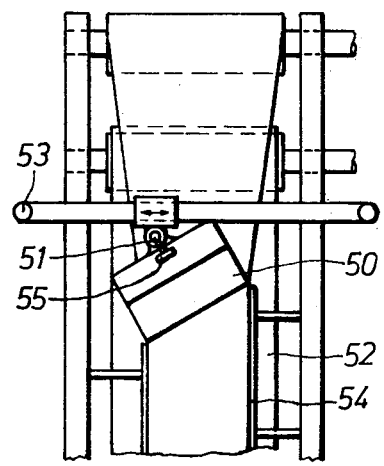
FIG. 4   FIG. 6

APPARATUS FOR APPLYING A LAYER OF A LIQUID FOAMABLE REACTION MIXTURE TO A CONTINUOUSLY MOVING SUPPORT

BACKGROUND OF THE INVENTION

In installations for the continuous production of foam blocks or foam sandwich panels, it is known to transport a bottom foil or lower surface layer on a conveyor belt and then apply a foamable reaction mixture to it. The applicator device used for this purpose generally consists of a mixing head which reciprocates transversely to the direction of movement of the conveyor belt so as to effect linear distribution of the reaction mixture. Accumulation of reaction mixture occurs at the turning points of the mixing head because at these points the mixture is thrown against the upturned sides of the bottom foil and then runs down them. This causes overlapping of mixture with the formation of superimposed layers in the finished foam and an irregular surface.

It has been proposed to arrange an inclined plane and overflow container upstream of the conveyor belt used in block foaming installations, and to apply the reaction mixture to the bottom of this container. The overflow container is designed so that the reaction mixture contained in it already begins to react as it moves upwards in the container so that when it flows over to the inclined plane it is already in the process of developing into a foam block. Characteristic of these processes are those disclosed in U.S. Pat. Nos. 3,786,122 and 3,832,099.

One disadvantage of this apparatus is that gas bubbles enclosed in the reaction mixture can no longer escape from the surface because the already partly reacted foam on the surface is so tough that air bubbles can not penetrate it. The bubbles therefore remain inside the block as troublesome defects. The formation of such gas bubbles is unavoidable because gas is already dissolved in the reactants and escapes during the mixing process due to the release of pressure at the constrictions in the feed pipes (e.g. nozzles) and then collects to form larger bubbles in the reaction mixture.

It is an object of the present invention to provide a process and an apparatus whereby mixture can be applied more uniformly to the moving support and at the same time a bubble-free foam can be produced.

BRIEF DESCRIPTION OF THE DRAWINGS

FIGS. 3 and 4 represent an example of the apparatus having a distributor channel adapted to pivot about a vertical axis, and FIGS. 5 and 6 represent another example of the apparatus having a distributor channel which is adapted to pivot about a vertical axis.

DESCRIPTION OF THE INVENTION

Figure 1:
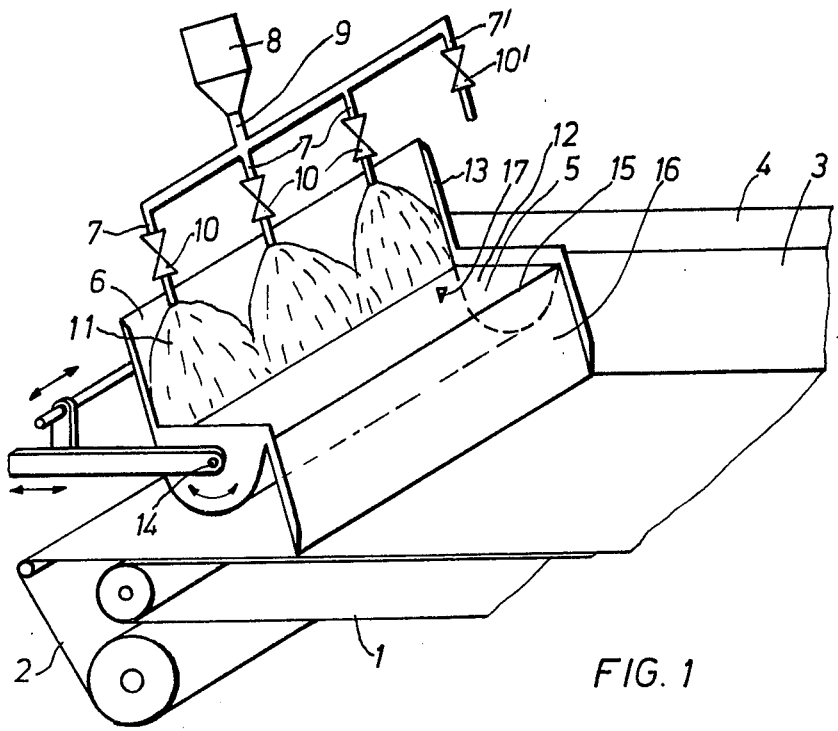
FIG. 1 represents a first embodiment of the apparatus having a sloping inflow in front of the distributor channel.

According to the instant invention, there is provided a process for the application of a layer of foamable liquid reaction mixture to a continously moving support, wherein the reaction mixture is subjected to a preliminary distribution transversely to the direction of movement of the support and is then conveyed to a place of intermediate storage in the form of a descending film, at least one side of which is exposed to the atmosphere and is subsequently applied to the support in the liquid state.

As a result of these measures, the reaction mixture leaving the mixing chamber is already spread out to the width of the foam during the preliminary distribution stage before it is set aside for intermediate storage. When the reaction mixture subsequently flows down as a film which is exposed to the atmosphere on at least one side, the gas bubbles can reach the surface and escape. The remaining gas bubbles, and any gas bubbles included as the film reaches the reaction mixture already set aside for storage, can immediately escape from the surface. The length of intermediate storage time is calculated so that the reaction mixture is still sufficiently fluid to enable gas bubbles to reach the surface. Larger inclusions of gas in the foam block finally produced can thereby be avoided.

According to the invention, there is also provided an apparatus for the application of a layer of foamable liquid reaction mixture to a continuously moving support, comprising at least one conduit and a deflector plate for the preliminary distribution of the reaction mixture transversely to the direction of movement of the support, the outlet from said at least one conduit, being arranged above the overflow of a distributor channel which extends transversely at the direction of travel of the support, the arrangement being such that the reaction mixture enters the distributor channel in the form of a film, at least one side of which is exposed to the atmosphere.

As a result of this arrangement, the reaction mixture, which is conveyed to the deflector plate by a hose or pipe, undergoes a preliminary distribution over this plate to the width of the foam and runs off the plate as a film to enter the distributor channel itself.

According to one particular embodiment, the deflector plate is in the form of an inclined inlet into the distributor channel on which the reaction mixture spreads out to the width of the foam. One surface of the film is exposed to the atmosphere.

Alternatively, the deflector plate may cooperate with a counterplate to form a gap. In that case, the gap between the deflector plate and counterplate is always kept full of reaction mixture, thereby ensuring uniform distribution. The film in this case is preferably left to descend under free fall. In this embodiment, the counterplate preferably forms part of the distributor channel, because a simpler construction is thereby obtained.

The width of the gap is preferably adjustable so that the thickness of the film can be regulated.

According to one particular embodiment, the distributor channel is adapted to pivot about an axis extending transversely to the conveyor belt. This pivoting action enables the volume in the distributor channel and hence the time of intermediate storage of the reaction mixture in the channel to be controlled.

The inflow is preferably composed of a plurality of branch pipes so that a first, rough preliminary distribution already takes place before the deflector plate is reached.

According to another particular embodiment, the branch pipes are equipped with adjustable valves. A uniform rate of flow to the deflector plate can thereby be achieved.

The distributor channel is preferably adapted to be increased in width by means of attachment pieces of similar cross-section so that production can be adjusted to blocks of different widths.

Alternatively, the distributor channel may be adapted to pivot about a vertical axis. This vertical axis is arranged either centrally to the distributor channel or to one side. The channel itself is then designed for the maximum width of blocks to be produced. The width to which the mixture is spread out can then be reduced by pivoting the channel about the vertical axis.

As shown in FIG. 1, a bottom foil 2 is carried on a conveyor belt 1. The lateral edges 3 of the foil 2 are turned upwards at the boundaries 4. The front boundary has been omitted from the drawing to show the apparatus more clearly. A distributor channel 5 is arranged above the bottom foil 2. This channel comprises a deflector plate 6 serving as inflow for the reaction mixture. Several branch pipes 7 of an outflow pipe 9 connected to the mixing apparatus 8 open above the deflector plate 6. Each branch pipe 7 contains a valve 10 which may be either cut off or adjusted to supply the necessary quantity of reaction mixture from each branch pipe 7 to produce a uniform film 11 across the whole width of the deflector plate 6. The valve 10' of the branch pipe 7' situated beside the deflector plate 6 is shut off. If a wider block is to be produced, an attachment of suitable width, similar in construction to the channel 5 and deflector plate 6, is attached to the channel and plate with a sealing fit after removal of the unscrewable side portion 12 with edge 13. The mixing apparatus 8 without outflow 9 is displaceable in three directions. The distributor channel 5 with deflector plate 6 is displaceable in the longitudinal and the transverse direction. It is also adapted to pivot about an axis 14 extending transversely to the direction of displacement of the conveyor belt 1. The transverse displacement provides for the correct adjustment to the conveyor belt 1 and adaptation to the required width of block by means of the attachment pieces. The possibility of longitudinal displacement enables the channel to be adjusted in relation to the conveyor belt 1 so that it can discharge material in the correct position on the belt. This may be necessary when several reaction mixtures differing in their reaction velocity are applied successively. The pivotal movement provides for adjustment of the volumetric capacity of the distributor channel 5 and hence the residence time of the reaction mixture in the channel. The reaction mixture passes over the overflow 15 while still in a fluid form and flows over a plate 16 to reach the bottom foil 2. The adjustability of the mixing apparatus 8 with outflow 9 serves for adjustment to the position of the distributor channel 5. The liquid level of the reaction mixture in channel 5 is indicated at 17.

Figure 2:
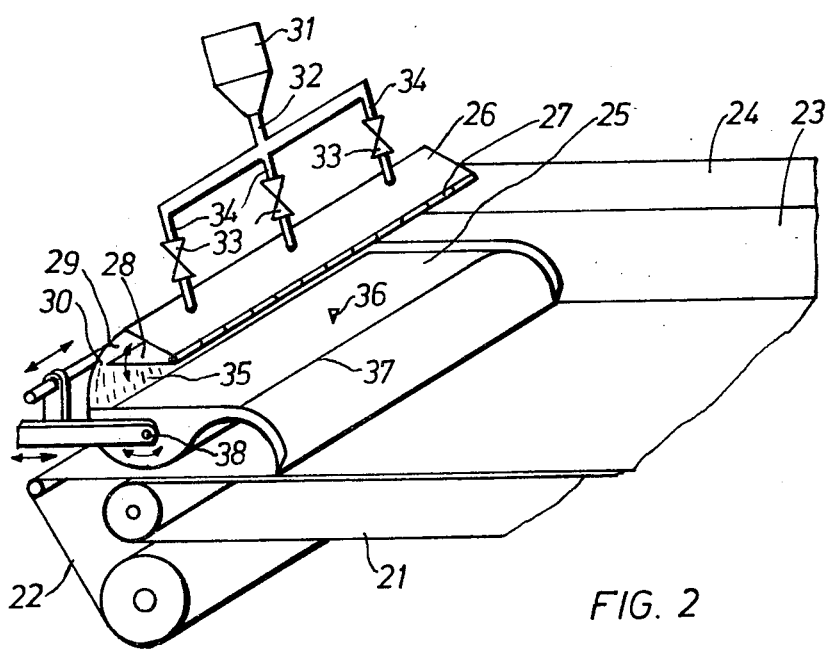
FIG. 2 represents a second embodiment of the apparatus in which the film descends under free fall.

As shown in FIG. 2, a bottom foil 22 whose lateral edges 23 are turned up at the boundaries 24 is conveyed on a conveyor belt 21. The front boundary has been omitted from the drawing so that the apparatus can be shown more clearly. A distributor channel 25 is arranged above the bottom foil 22. This channel 25 has the form of a horizontal S in cross-section. The upper edge strip 26 slopes obliquely downwards and a deflector plate 28 is pivotally fixed to it by means of a hinge 27. A gap 30 is formed between this deflector plate 28 and a counterplate 29 which is formed by the raised portion of the distributor channel 25. The space between the plate 28 and counterplate 29 is sealed off laterally. A mixing apparatus 31 has an outflow 32 whose branch pipes 34 have adjustable valves 33 and open on the deflector plate 28 by way of the edge strip 26. The pressure in the mixing chamber of the mixing apparatus 31 can be controlled by regulating the width of the gap. This pressure determines the size of the pores in the foam block. The reaction mixture falls freely from the gap 30 as a film 35 so that the gas bubbles contained in it can escape. The level of the reaction mixture is indicated by the mark 36. While still in a fluid state, the reaction mixture passes over the overflow 37 to the bottom foil 22. The distributor channel 25 is adjustable in the transverse and the longitudinal direction and in its distance to the conveyor belt 21 and is adapted to pivot about an axis 38. The branch pipes 34 consist of sufficiently long flexible tubes.

The mixing apparatus 31 is also longitudinally and transversely displaceable and adjustable in its height. The distributor channel 25 can be increased in width by attachment pieces in the same way as the example shown in FIG. 1.

If a narrower deflector plate 28 is used so that a wide gap is formed, the space between the deflector plate 28 and counterplate 29 does not become filled with reaction mixture. The plate 28 is then merely flooded but there is no back pressure to the mixing chamber.

As shown in FIGS. 3 and 4, the distributor channel 40 is mounted on a swivel arm 41 which enables it to pivot about a vertical shaft 44 fixed to the frame 43 of the conveyor belt 42 in a position lateral to the belt. The side walls 45 are adjustable in relation to each other to adjust the width of the block. The swivel arm can be fixed to the shaft 44 by a screw 46. The width across which the mixture is applied can be adjusted by suitably setting the angular position of the distributor channel 40.

As shown in FIGS. 5 and 6, the distributor channel 50 is mounted on a vertical shaft 51 which is pivotally fixed to the center of a yoke 53 extending across the conveyor belt 52. The side walls 54 are adjustable in relation to each other to adjust the width of the block. The angular position of the distributor channel 50 can be fixed by means of the screw 55.

In the embodiments shown in FIGS. 3, 4 and 5,6, the mixture is applied to the bottom foil at an angle to the direction of movement of the conveyor belt. Although this causes greater waste at the beginning and end of the block foaming process, the additional waste is negligible since the block foam installations generally operate for many hours at a time.

What is claimed is:

1. An apparatus for the application of a layer of foamable liquid reaction mixture to a continuously moving support, comprising: a continuously moving support and at least one conduit with an outlet and a deflector plate for the preliminary distribution of the reaction mixture transversely to the direction of movement of the support, the outlet from said at least one conduit being arranged above a distributor channel which extends transversely of the direction of travel of the support and which functions as a place of intermediate storage, the arrangement being such that the reaction mixture enters the distributor channel in the form of a film, at least one side of which is exposed to the atmosphere, and said deflector plate is located between said outlet and said distributor channel.

2. An apparatus as claimed in claim 1, wherein the deflector plate forms an oblique inflow to the distributor channel.

3. An apparatus as claimed in claim 1, further comprising a counterplate, which, together with the deflector plate, forms a gap for the reaction mixture.

4. An apparatus as claimed in claim 3, wherein the width of the gap is adjustable.

5. An apparatus as claimed in claim 1, further comprising a shaft extending transversely to the direction of travel of the support about which the distributor channel can be pivoted, whereby the volume of reaction mixture in the distributor channel, and hence the residence time of the reaction mixture in the distributor channel, can be adjusted.

6. An apparatus as claimed in claim 1, wherein said at least one conduit comprises a plurality of branch pipes, each of which is equipped with an adjustable valve.

7. An apparatus as claimed in claim 1, wherein the distributor channel is pivotable about a vertical axis, whereby the width to which the reaction mixture is spread out can be adjusted.

8. An apparatus as claimed in claim 7, wherein the distributor channel is mounted on a swivel arm which is pivotable about a vertical shaft arranged on one side of the distributor channel.

9. An apparatus as claimed in claim 7, wherein the distributor channel is fixed to a vertical shaft arranged within the width of the distributor channel, the shaft being movable transversely of the direction of movement of the support.

* * * * *